H. L. Perry.
Wheel Plow.
Nº 71,063.        Patented Nov. 19, 1867.
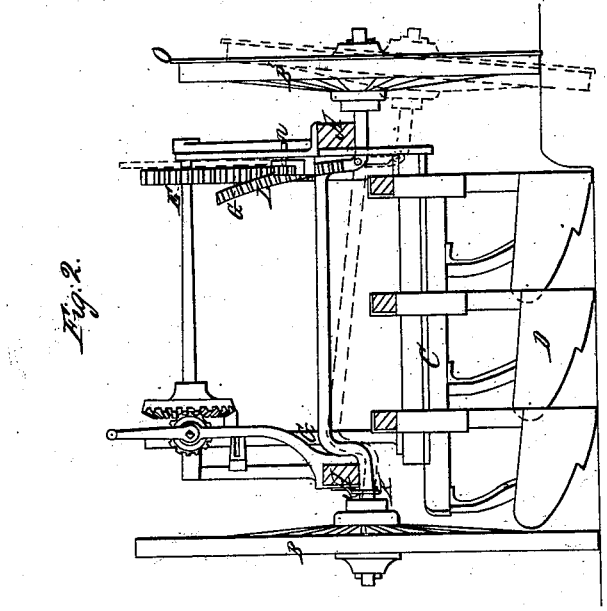
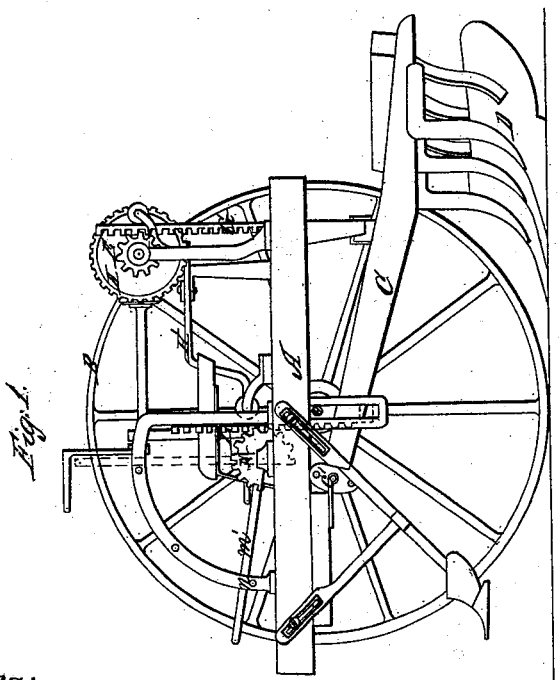
Witnesses:
W. C. Forbush
Edw. Wilhelm
Inventor:
Horace L. Perry

United States Patent Office.

HORACE L. PERRY, OF AURORA, NEW YORK.

Letters Patent No. 71,053, dated November 19, 1867.

---

IMPROVEMENT IN GANG-PLOUGHS.

---

The Schedule referred to in these Letters Patent and making part of the same.

---

TO ALL WHOM IT MAY CONCERN:

Be it known that I, HORACE L. PERRY, of Aurora, in the county of Erie, and State of New York, have invented certain new and useful Improvements in Gang-Ploughs; and I do hereby declare that the following is a full and exact description thereof, reference being had to the accompanying drawings, making a part of this specification, in which—

Figure I is a side elevation.

Figure II is a front elevation.

This invention is an additional improvement of my improved gang-plough, for which Letters Patent were duly granted April 30, 1867, No. 64,358, to which reference is hereby made, and consists in hinging the main frame A to the axle upon one side, and making the other side vertically adjustable in such manner that, no matter at what angle the axle of the machine may be inclined, the main frame, as well as the plough-frame thereto attached, can be adjusted and operated upon a level, for the purpose of better adapting the machine to its work in all contingencies which may possibly arise. Second, in making and providing one or both the driving-wheels with a projecting rib or flange, for the purpose of preventing the machine from slipping sidewise.

Letters of like name and kind refer to like parts in each of the figures.

It will be observed that the principal operating parts of this machine are substantially the same as those described in the patent granted to me as aforesaid, and therefore a brief description of the said parts is deemed sufficient for the purpose of this application.

A, main frame of the machine; B B' supporting-wheels; C, plough-frame, hinged to main frame at c'; D, ploughs; E E, pinions, and G G hinged racks for raising and lowering the rear end of the plough-frame; H, cog-wheel and H' stop-lever, both constituting a device for retaining the plough-frame in any desired position. The main frame A is hinged to the axle, as shown at K, upon that end thereof which is supported by the wheel of larger diameter. The opposite side of the main frame is not made fast to the axle, but may be raised and lowered, by means of a curved rack, L, connected to the axle, and projecting upwardly therefrom, and a pinion, M, supported upon the main frame. The pinion M carries a hand-lever, m', which is within convenient reach of the driver, so that he can grasp the same at any time while the machine is operating, and by bearing upon said lever revolve the pinion sufficiently to raise or lower the frame upon that side of the axle, for the purpose of bringing it into a level position. A stop-pin, n, or other equivalent device, is used for retaining that side of the frame at any desired elevation.

It will be seen upon examining the invention patented by me April 30, 1867, as hereinbefore mentioned, that the two supporting-wheels are made of unequal diameter, so that the larger one may travel in the furrow last made, while the smaller one travels upon the unbroken ground; hence the main frame, which is made fast to the axle, is always level, while one wheel travels in the furrow. But before a furrow has been made the main frame, and the plough-frame thereto attached, cannot be level, because the wheels are of unequal size, and both have to travel upon the unbroken ground.

My improvement obviates this difficulty, and furnishes a machine which is better adapted to the work, inasmuch as the main frame and ploughs may at all times be adjusted and move upon a level, whether one of the wheels travels in a furrow or not.

It will readily be seen that my improvement, herein set forth, may be used either in connection with a gang-plough having wheels of unequal diameter, or it may be used as a substitute or equivalent for such difference in the size of the wheels.

O represents a rib or flange formed upon the rim of one or both of the wheels B B', and projecting radially therefrom. It may be located upon either side of the face of the rim, or in the middle, as may be desired. The object of this rib or flange is to guide the machine upon a straight line, and prevent its slipping or sheering off sidewise, to which movement a slight tendency exists on account of the ploughs D having no land-sides, as is fully described in my said original patent.

What I claim as my invention, and desire to secure by Letters Patent, is—

1. In a gang-plough having a main frame, A, and a plough-frame C, substantially as herein described, I claim hinging the main frame A at one side upon the axle, so that it may be levelled in the manner and for the purpose set forth.

2. I claim the rib or flange O, formed upon the supporting-wheels substantially as and for the purpose set forth.

Witnesses:
B. H. MUEHLE,
W. H. FORBUSH.

HORACE L. PERRY.